(12) United States Patent
Hu et al.

(10) Patent No.: US 12,502,037 B1
(45) Date of Patent: Dec. 23, 2025

(54) FOLDABLE HANDLE FOR COOKING UTENSILS

(71) Applicant: ZHEJIANG NOVIA KITCHENWARE CO., LTD., Jinhua (CN)

(72) Inventors: Huacheng Hu, Jinhua (CN); Chengzhou Zhang, Jinhua (CN); Jinzhi Ye, Jinhua (CN)

(73) Assignee: ZHEJIANG NOVIA KITCHENWARE CO., LTD., Jinhua (CN)

( * ) Notice: Subject to any disclaimer, the term of this patent is extended or adjusted under 35 U.S.C. 154(b) by 0 days.

(21) Appl. No.: 19/291,555

(22) Filed: Aug. 5, 2025

(30) Foreign Application Priority Data

Jun. 30, 2025 (CN) .......................... 202510885989.7
Jun. 30, 2025 (CN) .......................... 202521347523.3

(51) Int. Cl.
*A47J 45/06* (2006.01)
*B25G 1/04* (2006.01)

(52) U.S. Cl.
CPC .............. *A47J 45/061* (2013.01); *B25G 1/04* (2013.01)

(58) Field of Classification Search
CPC .......... A47J 45/067; B25G 1/04; B25G 3/38; B65D 25/2841; B65D 25/2852
USPC .................................................. 220/757, 763
See application file for complete search history.

(56) References Cited

U.S. PATENT DOCUMENTS 6,220,477 B1 *  4/2001  Schneider ............. A47J 45/061
                                                         220/757

FOREIGN PATENT DOCUMENTS

| CN | 206473166 U | 9/2017 |
| CN | 222549090 U | 3/2025 |
| EP | 4480360 A1 * | 12/2024 |

* cited by examiner

*Primary Examiner* — Stephen J Castellano
(74) *Attorney, Agent, or Firm* — Mei & Mark LLP; Manni Li

(57) ABSTRACT

A foldable handle for cooking utensils comprises a connecting component and a handle. The connecting component comprises a pivot seat and a snap-fit seat. Pivot arms of the handle are rotatably connected to the pivot seat, and the handle is provided with a locking member. When the snap-fit seat is snap-fitted into a hook portion of the locking member, the handle is locked with the connecting component, and the handle is in a working position. When the snap-fit seat disengages from the hook portion, the handle is folded in the upper portion of the connecting component, and the handle is in a retracted position. The foldable handle has simple structure, is easy to manufacture, uses labor-saving operation, and has stability.

6 Claims, 3 Drawing Sheets

FOLDABLE HANDLE FOR COOKING UTENSILS

CROSS-REFERENCE TO RELATED APPLICATIONS

The subject application claims priority on Chinese Patent Application Nos. CN202510885989.7 and CN202521347523.3, both filed on Jun. 30, 2025 in China. The contents and subject matter of the Chinese priority applications are incorporated herein by reference.

TECHNICAL FIELD

The present invention belongs to the field of accessories for cooking utensils and similar pots, cookers, or containers, and in particular to a foldable handle for cooking utensils.

BACKGROUND ART

A cooking utensil such as a pot mainly comprises a pot body, a connecting base disposed on the pot body, and a handle disposed on the connecting base, where the handle is generally fixed on the connecting base by means of bolts, etc., and the connecting base is generally connected to the pot body in a welded or fixed manner, which occupies a large space and causes inconvenience in carrying, placing, and packaging. To facilitate placement and portability when the pot is not in use, the handle is designed to be detachable. However, the handle detaching structure in the existing technology is relatively complex, as the handle is usually provided with a switch button, and a complex elastic lock mechanism is installed in the handle. The switch button controls the connection or disconnection of the elastic lock with the pot body, assembly is troublesome, and replacement of damaged internal components is inconvenient.

Chinese Patent CN206473166U discloses a pot with a rotatable handle, the pot comprises a pot body and a handle base disposed on one side of the pot body, a pot handle is disposed on the handle base, the handle base is provided with a fixed platform, a rotating hole is formed at one end of the pot handle and rotatably matched with the fixed platform, a limiting structure is disposed between the fixed platform and the pot handle, a recess is formed on the fixed platform, a button is disposed in the recess, a snap-fit block is connected below the button, a spring is disposed below the snap-fit block, a first snap-fit groove matched with the snap-fit block is further formed in the recess, and a second snap-fit groove matched with the snap-fit block is disposed in the rotating hole of the pot handle; when the pot handle rotates and the second snap-fit groove coincides with the first snap-fit groove, the snap-fit block enters the second snap-fit groove, and the pot handle is unfolded and fixed in a hand-holdable working state; when the button is pressed, the snap-fit block disengages from the second snap-fit groove, and the pot handle rotate toward an upper surface of the pot body; a locking block is disposed at the other end of the pot handle, a locking groove is formed on an outer peripheral wall of the pot body, and when the pot handle rotates to a pot surface, the locking block is inserted into the locking groove, and the pot handle is retracted on the pot surface. The technical scheme achieves retraction of the pot handle on the pot surface without disassembly, and solves the problem that the fixed pot handle occupies a large space. However, the structure in which the pot handle is higher than the pot surface poses a challenge to the user's cooking habits. Additionally, the combination of the fixed platform and the rotating hole causes a large gap between the pot handle and the fixed platform, which easily causes violent shaking and instability during use.

Chinese Patent CN222549090U discloses a cooking utensil and a cooking utensil set, where a handle of the cooking utensil rotates vertically between a first working position and a second retracted position, a locking assembly is disposed in an internal cavity of the handle, the locking assembly comprises a locking member, a proximal end of the locking member comprises an upper surface at an acute angle relative to a plane of the handle, and a connecting portion thereof comprises a concave portion with an upper surface at an acute angle relative to the plane of the handle; in a first locking position, the angled upper surface at the proximal end of the locking member is engaged with a first contact point on the acute upper surface of the connecting portion, and the concave portion is located on a lower side of the connecting portion and matched with the proximal end of the locking member. In short, according to the technical scheme, the concave portion is disposed at the connecting portion, a convex portion is disposed at the proximal end of the handle, and when the handle is unfolded, the convex portion is inserted into the concave portion; and when the convex portion is disengaged from the concave portion, the handle may be folded relative to the connecting portion. The technical scheme eliminates the trouble of removing the handle for separate storage and achieves the purpose of reducing the space occupation by utilizing the space of the cooking utensil in a way of folding. However, when in use, bonding strength risks exist at the interface of engagement between the convex portion and the concave portion, and in particular, when the strength of the convex portion is insufficient, the risk of breakage is very likely to occur, thereby posing a safety hazard of the cooking utensil. Additionally, tight engagement between the convex portion and the concave portion is required, otherwise, the handle shakes violently during use due to a large gap. However, too tight engagement between the convex portion and the concave portion causes very cumbersome disengagement of the convex portion from the concave portion when the handle needs to be folded. Therefore, the technical scheme fails to achieve both stability and use convenience.

Further, the above-mentioned patent requires high manufacturing precision. As expressly stated in the patent, the engagement between the convex portion and the concave portion necessitates stringent angular alignment of a mating surface, otherwise, the convex portion hardly enters the concave portion when the handle is unfolded, or an excessively large gap between the convex portion and the concave portion easily causes instability during use.

SUMMARY OF THE INVENTION

An objective of the present invention is to provide a foldable handle for cooking utensils, which resolves the deficiencies of foldable handles in the existing technology comprising excessive requirements on material strength, operation inconvenience, and easy wobbling during use.

In order to achieve the above objective, the present invention provides the following technical solution:

A foldable handle for cooking utensils, comprising a connecting component and a handle, wherein the handle is rotatably connected to the connecting component, and the handle has a retracted position at which the handle is folded on an upper portion of the connecting component and a working position at which the handle is unfolded relative to the connecting component;

the connecting component comprises a mounting base, a pivot seat, and a snap-fit seat that are sequentially connected; pivot arms extend from two sides of a front end of the handle, and the pivot arms are rotatably connected to the pivot seat; a mounting cavity is formed at the front end of the handle, a locking assembly is disposed in the mounting cavity, and the locking assembly comprises a locking member, a driving member, and an elastic member; the driving member drives the locking member to extend outward from the mounting cavity, and the elastic member maintains an elastic force that drives the locking member to retract into the mounting cavity for resetting;

the mounting cavity of the handle further comprises an encapsulation plate, and the locking assembly is disposed in a space enclosed by the mounting cavity and the encapsulation plate; and the encapsulation plate comprises a limiting plate arranged in a vertical direction and a cover plate arranged in a horizontal direction;

the locking member comprises a hook portion and a connecting portion; the connecting portion is connected to the driving member; the elastic member is compressibly disposed between the connecting portion and the limiting plate, and both ends of the elastic member are respectively abutted against or connected to the limiting plate and the connecting portion; and when the snap-fit seat is snap-fitted into the hook portion to form an interlocked state, the handle is locked with the connecting component, and the handle is in the working position; and when the snap-fit seat disengages from the hook portion, the handle is folded in the upper portion of the connecting component, and the handle is in the retracted position.

In the present invention, a sliding hole configured for the movement of the driving member is formed on an upper surface of the mounting cavity at the front end of the handle; the connecting portion of the locking member is box-shaped; the driving member comprises an operating portion and an inserting portion, the operating portion and the inserting portion are connected to each other, the operating portion protrudes from an upper surface of the handle, the inserting portion extends into the mounting cavity through the sliding hole, the inserting portion is inserted into the connecting portion of the locking member, and the driving member slides in the sliding hole to drive the locking member to engage with or disengage from the snap-fit seat.

In the present invention, a cross section of the snap-fit seat is right-trapezoidal, and surfaces of contact between the snap-fit seat and the hook portion of the locking member are inclined surfaces; and the hook portion of the locking member is hook-shaped, comprising a hook tip, a hook bend, and a hook handle, wherein the hook handle is connected to the connecting portion, the hook bend is a space where the snap-fit seat enters the locking member and is locked, an outer side surface of the hook tip is an inclined surface and is arranged opposite to an inclined surface of the snap-fit seat, and angles of the two inclined surfaces are identical; and surfaces of contact between the hook bend and the snap-fit seat are planar surfaces, and when the snap-fit seat enters the hook bend, the snap-fit seat and the hook portion are interlocked.

In the present invention, the limiting plate of the encapsulation plate is connected to the cover plate at a right angle, a channel for the movement of the hook handle of the hook portion is disposed between the limiting plate and the upper surface of the handle, and the elastic member is disposed below the hook handle and between the limiting plate and the connecting portion.

In the present invention, the elastic member is a reset spring.

In the present invention, a screw hole is formed on the cover plate of the encapsulation plate, and a bolt penetrates the screw hole to fix the encapsulation plate on the handle.

The advantages of the present invention are as follows: 1. the locking member is designed to be hook-type and easy to manufacture, and is tightly combined with the snap-fit seat, thereby reducing wobble; 2. the outer side surface of the hook tip of the hook portion is configured as an inclined surface, and the surfaces of contact between the snap-fit seat and the hook portion are also configured as inclined surfaces matching each other, such that when the handle is unfolded, the snap-fit seat enters the hook bend of the hook portion in a convenient, labor-saving, and smooth manner, and the snap-fit seat automatically and smoothly enters the hook bend only by rotating the handle toward the working position at which the handle is unfolded; 3. the elastic member is compressibly disposed in the mounting cavity, which always applies an expanding elastic force to the locking member, such that the locking member always tends to retract into the mounting cavity for resetting, the hook portion of the locking member and the snap-fit seat form a structure of interlocking, and under the elastic force of the elastic member, the hook portion and the snap-fit seat are combined very stably, and the hook portion and the snap-fit seat are further interlocked also due to the gravity of a pot body during use; 4. the connecting portion is box-shaped and well matches the inner cavity space of the mounting cavity, thereby stabilizing the locking member; 5. the channel for the movement of the hook handle between the limiting plate and the upper surface of the handle is not only a channel for the hook handle, but also ensures that the hook portion only moves in the channel, where the gap between the channel and the hook handle may be controlled, thereby preventing the wobbling of the hook portion in the channel, and controlling the stability of the handle during use; and 6. the structure is simple, the operation is simple and convenient, and the manufacturing cost is low.

Reference numbers in the figures refer to the following structures: 1-connecting component; 11-mounting base; 12-pivot seat; 13-snap-fit seat; 2-handle; 21-pivot arm; 22-mounting cavity; 23-sliding hole; 24-channel; 3-locking member; 31-hook portion; 311-hook tip; 312-hook bend; 313-hook handle; 32-connecting portion; 4-driving member;

41-operating portion; 42-inserting portion; 5-elastic member; 6-encapsulation plate; 61-limiting plate; and 62-cover plate.

DETAILED DESCRIPTION OF THE INVENTION AND EMBODIMENTS

The present invention is further described below with reference to the accompanying drawings. The accompanying drawings are for illustrative description only, and may not be construed as a limitation on the present invention.

In order to explain the embodiment more concisely, some parts and components that are well known to those skilled in the art but are not relevant to the main content of the present invention might be omitted in the accompanying drawings or descriptions. In addition, for the convenience of description, some parts and components in the accompanying drawings may be omitted, enlarged or downsized, but this does not represent the size or entire structure of an actual product.

Figure 1:
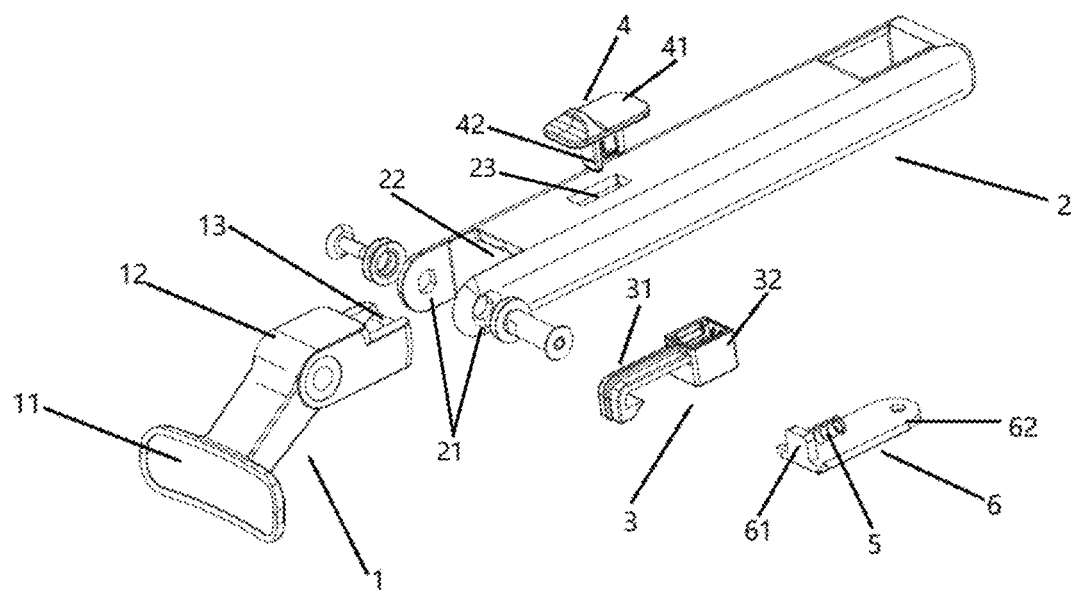
FIG. 1 is an exploded view showing the structure of the foldable handle for cooking utensils in the present invention.

The present invention discloses a foldable handle for cooking utensils. As shown in FIGS. 1-5, the foldable handle comprises a connecting component 1 and a handle 2, and as shown in FIG. 1, the connecting component 1 comprises a mounting base 11, a pivot seat 12, and a snap-fit seat 13, where the mounting base 11 is fixedly connected to a cooking utensil; pivot arms 21 extend from two sides of a front end of the handle 2, and the pivot arms 21 of the handle 2 are rotatably connected to the pivot seat 12 of the connecting component 1; as shown in FIGS. 3 and 5, the handle 2 rotates between a retracted position at which the handle is folded on an upper portion of the connecting component 1 and a working position at which the handle is unfolded relative to the connecting component 1; and that is, as shown in FIG. 5, the handle 2 may be folded on an upper surface of the cooking utensil.

Figure 2:
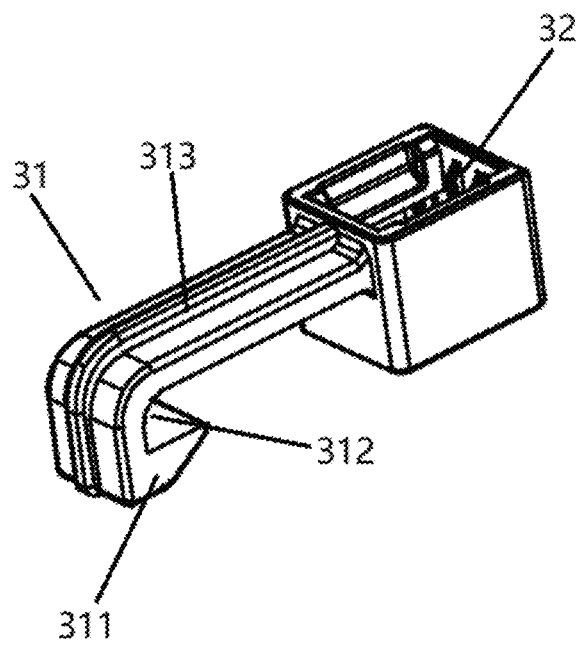
FIG. 2 shows the structure of the locking member in the present invention.
Figure 3:
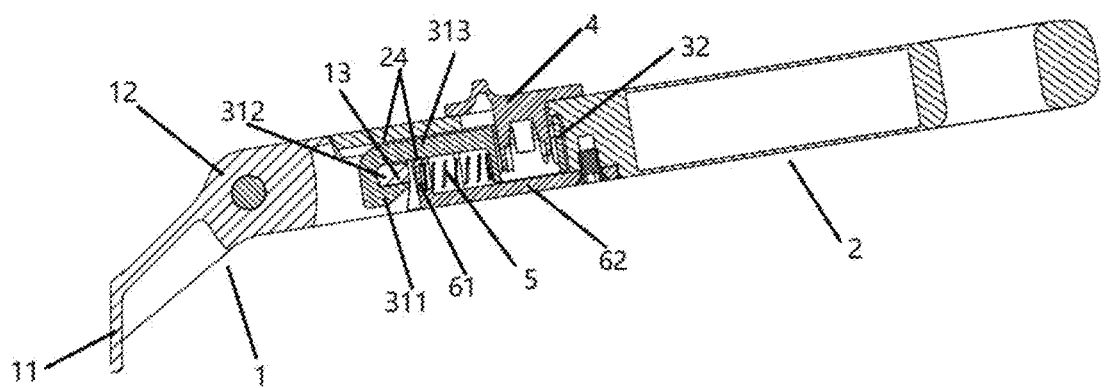
FIG. 3 shows the structure of the handle in an unfolded state in the present invention.

As shown in FIGS. 1 and 2, a mounting cavity 22 is formed at the front end of the handle 2, a locking assembly is disposed in the mounting cavity 22, and the locking assembly comprises a locking member 3, a driving member 4, and an elastic member 5.

As shown in FIGS. 1-3, the mounting cavity 22 of the handle 2 further comprises an encapsulation plate 6, and the locking assembly is disposed in a space enclosed by the mounting cavity 22 and the encapsulation plate 6; and the encapsulation plate 6 comprises a limiting plate 61 arranged in a vertical direction and a cover plate 62 arranged in a horizontal direction, and preferably, the limiting plate 61 is connected to the cover plate 62 at a right angle.

The locking member 3 comprises a hook portion 31 and a connecting portion 32; the connecting portion 32 is connected to the driving member 4; the elastic member 5 is compressibly disposed between the connecting portion 32 and the limiting plate 61, and both ends of the elastic member 5 are respectively abutted against or connected to the limiting plate 61 and the connecting portion 32.

The driving member 4 drives the locking member 3 to extend outward from the mounting cavity 22, such that the locking member 3 is disengaged from the snap-fit seat 13; since the elastic member 5 is disposed between the connecting portion 32 and the limiting plate 61 and maintained in a compressed state, an elastic force that drives the locking member 3 to retract into the mounting cavity 22 is maintained, thereby ensuring very secure interlocking engagement between the locking member 3 and the snap-fit seat 13.

When the snap-fit seat 13 is snap-fitted into the hook portion 31 to form an interlocked state, the handle 2 is locked with the connecting component 1, and the handle 2 is in the working position; and when the snap-fit seat 13 disengages from the hook portion 31, the handle 2 is folded in the upper portion of the connecting component 1, and the handle 2 is in the retracted position.

Further, as shown in FIGS. 1-4, a sliding hole 23 configured for the movement of the driving member 4 is formed on an upper surface of the mounting cavity 22 at the front end of the handle 2, the connecting portion 32 of the locking member 3 is box-shaped, the box-shaped connecting portion 32 is arranged to match the space of the mounting cavity 22, and the box-shaped arrangement ensures that the locking member 3 does not oscillate laterally in the mounting cavity 22, which is a key factor for maintaining the stability of the handle 2 during use.

The driving member 4 comprises an operating portion 41 and an inserting portion 42, the operating portion 41 and the inserting portion 42 are connected to each other, the operating portion 41 protrudes from an upper surface of the handle 2, the inserting portion 42 extends into the mounting cavity 22 through the sliding hole 23, the inserting portion 42 is inserted into the connecting portion 32 of the locking member 3, and the driving member 4 slides in the sliding hole 23 to drive the locking member 3 to engage with or disengage from the snap-fit seat 13.

As shown in FIGS. 2-5, a cross section of the snap-fit seat 13 is right-trapezoidal, and surfaces of contact between the snap-fit seat 13 and the hook portion 31 of the locking member 3 are inclined surfaces; and Further, as shown in FIG. 2, the hook portion 31 of the locking member 3 is hook-shaped, comprising a hook tip 311, a hook bend 312, and a hook handle 313, the hook handle 313 is connected to the connecting portion 32, the hook bend 312 is a space where the snap-fit seat 13 enters the locking member 3 and is locked, an outer side surface of the hook tip 311, which is in contact with the snap-fit seat 13, is also configured as an inclined surface, and is arranged opposite to an inclined surface of the snap-fit seat 13, and angles of the two inclined surfaces are identical. When the handle 2 is unfolded toward the working position, the inclined surface of the snap-fit seat 13 is a guiding surface for the sliding of the hook tip 311, such that the rotation of the handle 2 is labor-saving.

Surfaces of contact between the hook bend 312 and the snap-fit seat 13 are planar surfaces, when the snap-fit seat 13 enters the hook bend 312, their planar surfaces are in flush contact with each other, the snap-fit seat 13 and the hook portion 31 are stably interlocked, and under the combined action of an elastic force of the elastic member 5 and a gravity of the cooking utensil, the hook bend and the snap-fit seat are increasingly interlocked, which is a main feature designed to ensure the stability of the handle 2 during use.

A channel 24 for the movement of the hook handle 313 of the hook portion 31 is disposed between the limiting plate 61 and the upper surface of the handle 2, the channel 24 is not only a channel for the movement of the hook handle 313, but also limits and supports upper and lower positions of the hook handle 313, and a gap between the channel 24 and the hook handle 313 should be strictly controlled, which is one of control factors that prevent vertical wobbling of the handle 2 during use.

Further, the elastic member 5 is disposed below the hook handle 313 and between the limiting plate 61 and the connecting portion 32 of the locking member 3. The elastic member 5 is typically a reset spring. A screw hole is formed on the cover plate 62 of the encapsulation plate 6, and a bolt penetrates the screw hole to fix the encapsulation plate 6 on the handle 2.

Figure 4:
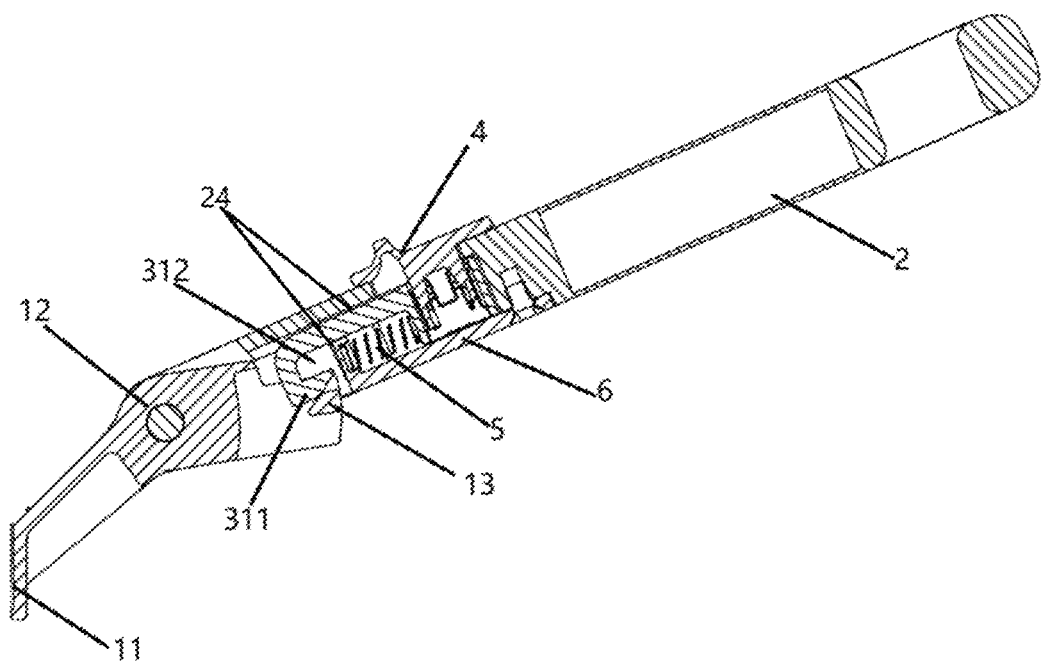
FIG. 4 shows the structure of the handle when the unfolded state is released in the present invention.
Figure 5:
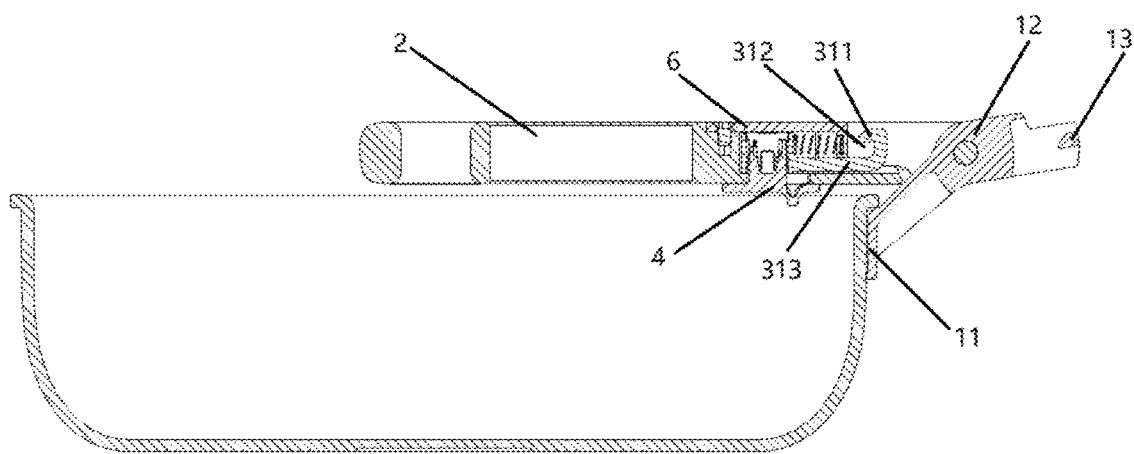
FIG. 5 shows the handle of the present invention folded over a cooking utensil.

When the handle 2 rotates from the retracted position in FIG. 5 to the unfolded working position in FIG. 3 and then rotates to the position shown in FIG. 4, the outer side surface of the hook tip 311 abuts against the inclined surface of the snap-fit seat 13, and when the handle 2 further rotates, the hook tip 311 slides downward along the inclined surface of the snap-fit seat 13, the hook handle 313 is pulled to extend from the channel 24 toward the connecting component 1 outside the mounting cavity 22, and the elastic member 5 is compressed and contracted; when the hook tip 311 slides to a distal end of the inclined surface of the snap-fit seat 13 and disengages from the snap-fit seat 13, a compressive force on the elastic member 5 suddenly disappears, such that the elastic member expands instantly, and the connecting portion 32 of the locking member 3 is driven to retract into the mounting cavity 22 for resetting; and in this way, the snap-fit seat 13 enters the hook bend 312 of the hook portion 31, the snap-fit seat 13 and the hook portion 31 are interlocked, the handle 2 is locked with the connecting component 1, and the handle 2 is fixed at the unfolded working position shown in FIG. 3. The outer side surface of the hook tip 311 of the hook portion 31 and a contact surface of the snap-fit seat 13 are designed as inclined surfaces, such that the handle 2 is unfolded in a very convenient and labor-saving manner, contact planes of the hook bend 312 and the snap-fit seat 13 are in flush contact with each other, the snap-fit seat 13 and the hook portion 31 are stably interlocked, and under the action of an elastic force of the elastic member 5 and a gravity of the cooking utensil, the hook bend and the snap-fit seat are increasingly interlocked, which ensures the stability of the handle 2 without wobbling during use.

Notably, when the handle 2 rotates to the position shown in FIG. 4, the operating portion 41 of the driving member 4 may be pushed with a finger to push the locking member 3 until the hook tip 311 slides over the distal end of the inclined surface of the snap-fit seat 13, and in this case, when the finger is released, the locking member 3 resets into the mounting cavity 22 under the elastic force of the elastic member 5, the snap-fit seat 13 enters the hook bend 312 of the hook portion 31, and the handle 2 is fixed at the unfolded working position shown in FIG. 3.

To rotate the handle 2 from the working position in FIG. 3 to the retracted position in FIG. 5, it is only necessary to push the driving member 4 toward the connecting component 1, that is, the finger pushes the operating portion 41 of the driving member 4 to move in the sliding hole 23 toward the connecting component 1, the driving member 4 drives the locking member 3 to move toward the connecting component 1 outside the mounting cavity 22 until the snap-fit seat 13 exits from the hook bend 312, the snap-fit seat 13 disengages from the hook portion 31, and the handle 2 rotates toward the cooking utensil to which the connecting component 1 is fixed, until the handle 2 rotates to the retracted position as shown in FIG. 5, where the handle 2 is folded over the cooking utensil to which the connecting component 1 is fixed and remains in the retracted state.

The foregoing descriptions are merely preferred embodiments of the present invention, and are not intended to limit the scope of protection of the present invention. That is to say, all equivalent changes and modifications made based on the contents of the patentable scope of the present invention shall fall within the technical scope of the present invention.

We claim:

1. A foldable handle for cooking utensils, comprising
a connecting component (1), and
a handle (2),
wherein the handle (2) is rotatably connected to the connecting component (1), and the handle (2) has a retracted position at which the handle is folded on an upper portion of the connecting component (1) and a working position at which the handle is unfolded relative to the connecting component (1);
the connecting component (1) comprises a mounting base (11), a pivot seat (12), and a snap-fit seat (13) that are sequentially connected; pivot arms (21) extend from two sides of a front end of the handle (2), and the pivot arms (21) are rotatably connected to the pivot seat (12); a mounting cavity (22) is formed at the front end of the handle (2), a locking assembly is disposed in the mounting cavity (22), and the locking assembly comprises a locking member (3), a driving member (4), and an elastic member (5); the driving member (4) drives the locking member (3) to extend outward from the mounting cavity (22), and the elastic member (5) maintains an elastic force that drives the locking member (3) to retract into the mounting cavity (22) for resetting;
the mounting cavity (22) of the handle (2) further comprises an encapsulation plate (6), and the locking assembly is disposed in a space enclosed by the mounting cavity (22) and the encapsulation plate (6); and the encapsulation plate (6) comprises a limiting plate (61) arranged in a vertical direction and a cover plate (62) arranged in a horizontal direction;
the locking member (3) comprises a hook portion (31) and a connecting portion (32); the connecting portion (32) is connected to the driving member (4); the elastic member (5) is compressibly disposed between the connecting portion (32) and the limiting plate (61), and both ends of the elastic member (5) are respectively abutted against or connected to the limiting plate (61) and the connecting portion (32); and
when the snap-fit seat (13) is snap-fitted into the hook portion (31) to form an interlocked state, the handle (2) is locked with the connecting component (1), and the handle (2) is in the working position; and when the snap-fit seat (13) disengages from the hook portion (31), the handle (2) is folded in the upper portion of the connecting component (1), and the handle (2) is in the retracted position.

2. The foldable handle for cooking utensils according to claim 1, wherein a sliding hole (23) configured for the movement of the driving member (4) is formed on an upper surface of the mounting cavity (22) at the front end of the handle (2);
the connecting portion (32) of the locking member (3) is box-shaped; the driving member (4) comprises an operating portion (41) and an inserting portion (42), the operating portion (41) and the inserting portion (42) are connected to each other, the operating portion (41) protrudes from an upper surface of the handle (2), the inserting portion (42) extends into the mounting cavity (22) through the sliding hole (23), the inserting portion (42) is inserted into the connecting portion (32) of the locking member (3), and the driving member (4) slides in the sliding hole (23) to drive the locking member (3) to engage with or disengage from the snap-fit seat (13).

3. The foldable handle for cooking utensils according to claim 1, wherein a cross section of the snap-fit seat (13) is right-trapezoidal, and surfaces of contact between the snap-fit seat (13) and an outer side of the hook portion (31) of the locking member (3) are inclined surfaces; and the hook portion (31) of the locking member (3) is hook-shaped, comprising a hook tip (311), a hook bend (312), and a hook handle (313), wherein the hook handle (313) is connected to the connecting portion (32), the hook bend (312) is a space where the snap-fit seat (13) enters the locking member (3) and is locked, an outer side surface of the hook tip (311) is an inclined surface and is arranged opposite to an inclined surface of the snap-fit seat (13), and angles of the two inclined surfaces are identical; and surfaces of contact between the hook bend (312) and the snap-fit seat (13) are planar surfaces, and when the snap-fit seat (13) enters the hook bend (312), the snap-fit seat and the hook portion (31) are interlocked.

4. The foldable handle for cooking utensils according to claim 2, wherein the limiting plate (61) of the encapsulation plate (6) is connected to the cover plate (62) at a right angle, a channel (24) for the movement of the hook handle (313) of the hook portion (31) is disposed between the limiting plate (61) and the upper surface of the handle (2), and the elastic member (5) is disposed below the hook handle (313) and between the limiting plate (61) and the connecting portion (32).

5. The foldable handle for cooking utensils according to claim 4, wherein the elastic member (5) is a reset spring.

6. The foldable handle for cooking utensils according to claim 4, wherein a screw hole is formed on the cover plate (62) of the encapsulation plate (6), and a bolt penetrates the screw hole to fix the encapsulation plate (6) on the handle (2).

* * * * *